(12) United States Patent
Kiviranta

(10) Patent No.: US 6,597,251 B2
(45) Date of Patent: Jul. 22, 2003

(54) METHOD FOR DEMODULATING SIGNAL

(75) Inventor: Markku Kiviranta, Oulu (FI)

(73) Assignee: Nokia Corporation, Espoo (FI)

( * ) Notice: Subject to any disclaimer, the term of this patent is extended or adjusted under 35 U.S.C. 154(b) by 32 days.

(21) Appl. No.: 10/007,691

(22) Filed: Dec. 10, 2001

(65) Prior Publication Data

US 2003/0112061 A1 Jun. 19, 2003

(51) Int. Cl.$^7$ .......................... H03D 3/00; H04L 27/06; H04L 27/14

(52) U.S. Cl. ....................... 331/341; 375/340

(58) Field of Search .................. 329/315, 318, 329/341–343; 375/334–337, 340–342, 346

(56) References Cited

U.S. PATENT DOCUMENTS 6,385,256 B1 * 5/2002 Piirainen et al. ............ 375/306

OTHER PUBLICATIONS

Fonollosa et al., "Estimation of the Modulation Index of CPM Signals Using Higher-Order Statistics," Proc. of ICASSP 93, Apr. 27–30, 1993, Minneapolis, MN, pp. IV 268–271.

Jager et al., "A Novel Method to Achieve Spectrum Economy in Digital Transmission," IEEE Transactions on Communications, vol. 26, No. 5, May 1978, pp. 534–542.

Miller, "Detection of CPFSK Signal Using Per SUrvivor Processing," Proceedings, IEEE Militiary Communications Conference MILCOM, Oct. 19021, 1998, Bedford, MA, pp. 524–528.

* cited by examiner

*Primary Examiner*—David C. Mis
(74) *Attorney, Agent, or Firm*—Pillsbury Winthrop LLP

(57) ABSTRACT

The invention relates to a demodulator and a demodulation method for a TFM-modulated signal comprising symbols, the method comprising the steps of calculating an estimate for the symbols, determining an estimate for the phase shift, determining a modulation index estimate error using the phase shift and the symbol estimates and removing the estimated error from the modulation index estimate using the symbol estimates.

13 Claims, 1 Drawing Sheet

METHOD FOR DEMODULATING SIGNAL

FIELD

The invention relates to a method and an apparatus for demodulating a TFM-modulated signal comprising symbols. The invention is particularly applicable in radio systems that employ the TFM modulation method.

BACKGROUND

A modulation method to be used on the transmission path is an essential parameter in data transmission systems, particularly in radio systems. Information symbols to be transferred cannot be transferred as such over the transmission path owing to the losses occurring on the transmission path and to the capacity of the transmission path. Instead the symbols must be modulated using an appropriate method in order to obtain an adequate capacity and quality on the transmission path.

Particularly in radio systems an essential factor is the band-width required by the transmission. It is an aim to achieve a transmission capacity that is as extensive as possible on a limited bandwidth. On the other hand, both the transmitter and the receiver should be as simple as possible and advantageous to implement. What is mainly employed in radio systems is a standard envelope modulation method, since then a C-class amplifier solution can be used. The structure of the C-class amplifiers is simple and the efficiency thereof is advantageous. This is substantial particularly in view of the power consumption of the terminals.

Several known modulation methods exist that have a constant envelope. One example is the CPM (Continuous Phase Modulation) type of methods, such as MSK (Minimum Shift Keying), GMSK (Gaussian Minimum Shift Keying), TFM (Tamed Frequency Modulation). The TFM is a particularly interesting modulation method, since the spectrum use thereof is efficient and also as the TFM modulator can be implemented using a simple FM modulator. Consequently the transmitter could be implemented in a very simple manner.

The FM modulator is thus a preferable way to implement a CPM signal. However, keeping the modulation index constant during transmission constitutes a problem for a wider use of the FM modulator. In the TFM method, the modulation index should be constant, and determined to have the value 0.5. When using the FM modulator the variation of the modulation index causes time varying phase jitter to the signal to be transmitted. Since the phase of a generated TFM signal cannot be kept at a desired level during transmission, the performance deteriorates significantly in a coherent receiver.

In prior art solutions; a suggestion has been made to implement compensation for the modulation index variation in connection with the transmitter. This is explained, for instance, in publication Jager F. & Dekker C. D., A Novel Method to Achieve Spectrum Economy in Digital Transmission. IEEE Transactions on Communications, May 1978, Vol. 26, No. 5, pages 534 to 542. A drawback with this system is that the structure of the transmitter becomes complicated.

Publication Fonollosa J. R. & Fonollosa J. A. R., Estimation of the modulation index of CPM signals using higher-order statistics. Proc. of ICASSP 93, April 27–30, Minneapolis, Minn., pages IV 268 to 271 discloses a solution, in which the modulation index variation is compensated in the receiver, but the solution either requires determining the theoretical autocorrelation or measuring the cross-correlation in the receiver. These are demanding tasks and the latter requires the existence of known data, such as a training sequence.

Publication Miller M. J., Detection of CPFSK Signal Using Per Survivor Processing. Proceedings—IEEE Military Communications Conference MILCOM, Oct. 19–21, 1998, Bedford, Mass., USA, pages 524 to 528 shows that the per-survivor processing, PSP, phase synchronization algorithm of the carrier wave is used in the receiver to compensate for the phase jitter caused by the modulation index variation. However, if the deviation of the modulation index between the receiver and the transmitter is high, then a mere phase synchronization algorithm is not enough.

BRIEF DESCRIPTION

It is an object of the present invention to provide a method and an apparatus implementing the method in such a manner that the modulation index variation caused by an FM modulator can be compensated in a demodulator. This is achieved with a demodulation method for a TFM-modulated signal comprising symbols, the method comprising the steps of calculating an estimate for the symbols, determining an estimate for the phase shift, determining a modulation index estimate error using the phase shift and the symbol estimates, removing the estimated error from the modulation index estimate.

The invention also relates to a demodulator for a TFM-modulated signal comprising symbols, the demodulator comprising means for calculating an estimate for the symbols, means for determining an estimate for the phase shift, means for determining a modulation index estimate error using the phase shift and the symbol estimates and means for removing the estimated error from the modulation index estimate.

The preferred embodiments of the invention are disclosed in the dependent claims.

In the preferred embodiments of the invention the modulation index variation can be compensated in the receiver. Thus, a simple FM modulator can be used as the transmitter. This provides significant advantages in several telecommunication systems, for example in point-to-multipoint (PMP) systems that include one central station and a large number of terminals. The structure of the central station may be complex, but the simple structure of the terminals provides significant savings. The present invention makes this possible.

In the preferred embodiments of the invention, the modulation index variation is based on a TFM coding rule and on the symbol decisions made. The value of the modulation index can be estimated continuously and the estimation allows making the modulation index in the receiver congruent with the modulation index of the transmitter. In a preferred embodiment the index estimated in the receiver is sent to the transmitter, which may correct the modulation index in accordance with the information obtained to be closer to the defined nominal value 0.5.

BRIEF DESCRIPTION OF THE DRAWINGS

In the following the invention will be described in greater detail by means of the preferred embodiments with reference to the accompanying drawings, in which.

DESCRIPTION OF PREFERRED EMBODIMENTS

Figure 1:
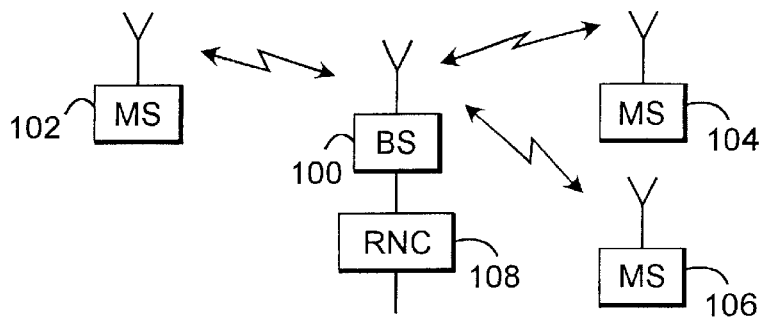
FIG. 1 shows an example of a system in which the preferred embodiments can be applied.

FIG. 1 is a simplified illustration of a digital data transmission system, in which the solution of the invention can be applied. What is concerned here is a part of a cellular radio system comprising a base station 100 with a radio connection to subscriber terminals 102 to 106, which may be fixedly mounted, vehicle mounted or hand-held portable terminals. The base station 100 communicates further with a base station controller 108, which conveys the connections of the terminals elsewhere in the network. The base station controller 108 controls the base station communicating therewith in a centralized manner. A connection can also be maintained from the cellular radio system to the public switched telephone network through the base station controller.

The subscriber terminals are small transceivers, and the base station generally comprises a set of transceivers, each one of which communicating with a subscriber terminal under the control of the base station controller.

FIG. 1 also illustrates a PMP system including a central station 100 and a number of terminals 102 to 106.

Since the TFM modulation belongs to the CPM (Continuous Phase Modulation) modulation group, CPM signals are at first generally viewed. In CPM modulation, the phase of the signal to be sent is altered in accordance with the data symbols to be sent. A CPM-modulated signal s(t) can be presented in the following form $$s(t) = e^{j\phi(t,\alpha)},$$

where t represents time,

φ is the signal phase and

α={$α_i$} represents the M-ary data symbols {±1, ±3, ..., ±(M+1)}.

The phase φ(t, α) during the symbol interval kT<t<(k+1)T is indicated as follows $$\phi(t, \alpha) = \eta(t, C_k, \alpha_k) + \Phi_k,$$

where $\eta(t, C_k, \alpha_k) = 2\pi h \sum_{i=k-L+1}^{k} \alpha_i q(t - iT)$ $C_k = (\alpha_{k-L+1}, \ldots, \alpha_{k-2}, \alpha_{k-1})$ $$\Phi_k = \left[\pi h \sum_{i=-\infty}^{k-L} \alpha_i\right] \mod 2\pi$$

Above $C_k$ is the correlative state of the modulation and $\Phi_k$ is the phase state of the modulator. The modulation index is denoted by letter h and it is the ratio of two integers h=K/P, where figures K and P do not share common factors. The phase pulse of the modulator q is normalized in such a manner that $$q(t) = \begin{cases} 0, & t \leq 0 \\ 1/2 & t \geq LT. \end{cases}$$

The derivative thereof dq/dt=g(t) is the frequency pulse of the modulator. L denotes the length of the frequency pulse in symbols. If L=1, then the corresponding CPM method is referred to as a full response CPM. Otherwise (L>1) the method is referred to as a partial response CPM. By selecting different frequency pulses g(t) and by varying the parameters h and M, a large number of different CPM methods can be obtained.

Let us next take a closer look at a TFM (Tamed Frequency Modulation) method, which is a binary (M=2) CPM method with excellent spectral properties. The coding rule for a TFM signal at the instant of time t=kT can be presented as follows $$\phi(kT + T) - \phi(kT) = 2\pi h \sum_{i=-\infty}^{\infty} \alpha_{k-i}[q(iT + T) - q(iT)], \quad (1)$$

$$k = 1, 2, \ldots$$

where $$q(iT + T) - q(iT) = \int_{iT}^{(i+1)T} g(t)dt = \begin{cases} 1/8 & \text{when } |i| = 1, \\ 1/4 & \text{when } |i| = 0, \\ 0 & \text{otherwise} \end{cases} \quad (2)$$

The frequency pulse g(t) can be defined more precisely as follows:

$$g(t) = \frac{1}{8}g_0(t - T) + \frac{1}{4}g_0(t) + \frac{1}{8}g_0(t + T) \quad (3)$$

where $$g_0(t) \approx \sin\left(\frac{\pi t}{T}\right)\left[\frac{1}{\pi t} - \frac{2 - \frac{2\pi t}{T}\cot\left(\frac{\pi t}{T}\right) - \frac{\pi^2 t^2}{T^2}}{\frac{24\pi t^3}{T^2}}\right]. \quad (4)$$

Figure 2:
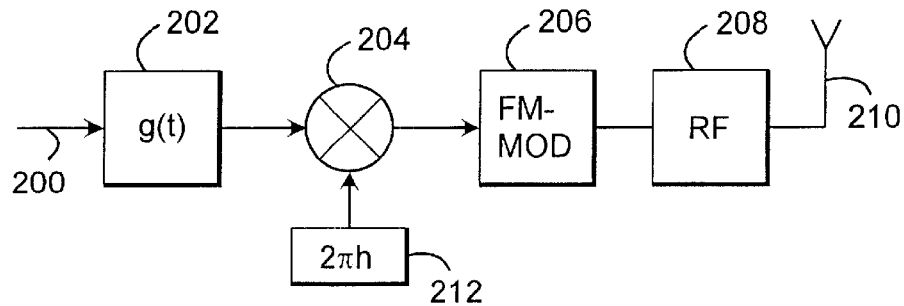
FIG. 2 shows an example of a TFM modulator.

FIG. 2 is a block diagram illustrating the structure of the transmitter where the TFM modulator is implemented using the FM modulator. Symbols {$α_i$} 200 to be sent are at first applied to means 202, where they are multiplied by the frequency pulse g(t). Thereafter, the signal is multiplied in a multiplier 204 by term 2πh, where h is the modulation index. Finally the signal is applied to an actual FM modulator 206. From the modulator the signal is transmitted through radio frequency parts 208 and an antenna 210. The advantages provided by such a transmitter include a simple and economical structure and the applicability to high data rates. A drawback is, as already stated above, that the modulation index tend to vary during transmission. In a TFM method the modulation index value should be fixedly determined as 0.5.

In the preferred embodiments of the invention, the actual modulation index is estimated in the receiver. The estimation is based on the TFM coding rule. If formulas (1) and (2) are combined, then the following formula is obtained for the phase shift $\psi_{k+1}$ of two consecutive symbols k and k+1

$$\psi_{k+1} = \phi(kT + T) - \phi(kT) = \pi h\left(\frac{1}{4}a_{k-1} + \frac{1}{2}a_k + \frac{1}{4}a_{k+1}\right), \quad (5)$$

$$k = 1, 2, \ldots$$

where φ(kT+T) is the phase at the time (k+1)T and φ(kT) is the phase at the time kT and h is the modulation index. Using formula (5) and knowing that the TFM is a binary modulation method (M=2), the following phase shift table can be provided:

TABLE 1

| $a_{k-1}$ | $a_k$ | $a_{k+1}$ | $\psi_{k+1}$ |
|---|---|---|---|
| 1 | 1 | 1 | $\pi h$ |
| −1 | −1 | −1 | $-\pi h$ |
| 1 | −1 | 1 | 0 |
| −1 | 1 | −1 | 0 |
| 1 | 1 | −1 | $\pi h/2$ |
| −1 | 1 | 1 | $\pi h/2$ |
| 1 | −1 | −1 | $-\pi h/2$ |
| −1 | −1 | 1 | $-\pi h/2$ |

In a preferred embodiment of the invention, an estimate is measured for the phase shift $\psi_{k+1}$ in the receiver. When the estimates for the received symbols $a_{k-1}$, $a_k$ and $a_{k+1}$ are determined, or when the symbols $a_{k-1}$, $a_k$ and $a_{k+1}$ are known in the receiver, i.e. if a training sequence is used, the estimate $\hat{h}$ of the actual modulation index can be obtained using table 1.

Let us assume that moment k includes an estimate $\hat{h}_k$ obtained for the modulation index. For the following moment k+1 the modulations index can be estimated using the formula $$\hat{h}_{k+1} = \hat{h}_k + \eta e_k, \quad (6)$$

where $\eta$ is an updating constant and $e_k$ is the error to be estimated for the modulation index. The error can be estimated by determining an estimate for the phase shift $\psi_{k+1}$ by means of the received symbols $\{a\}$ as follows:

$$\tilde{\psi}_{k+1} = \pi(\hat{h}_k + e_k)\left(\frac{1}{4}a_{k-1} + \frac{1}{2}a_k + \frac{1}{4}a_{k+1}\right)$$

from where the following is obtained as the modulation index error $$e_k = \frac{\tilde{\psi}_{k+1} - \pi \hat{h}_k b_k}{\pi b_k}, \quad (7)$$

where $$b_k = \left(\frac{1}{4}a_{k-1} + \frac{1}{2}a_k + \frac{1}{4}a_{k+1}\right).$$

Here, it should be noted that when $b_k=0$, then the calculation of formula (7) cannot be carried out due to the division of zero. The updating constant $\eta$ can be determined using the normalized noise equivalent bandwidth $B_L T$, i.e.

$$B_L T = \frac{\eta A}{2(2 - \eta A)},$$

where A is the slope of the S curve at the origin. The S curve indicates the mean of the error signal $e_k$, when h has a fixed value $\hat{h}$, for which $\tilde{h} = h - \hat{h}$. More generally, if $\hat{h}=0$ is set, then $\tilde{h}=h$ is obtained, and finally the S curve as the function of h can be depicted as $S(h)=E\{e_k|h\}$. $B_L$ refers to the noise equivalent bandwidth normalized at the symbol interval.

The modulation index estimate $\hat{h}$ thus obtained can be used for controlling data transmission in various ways. In a preferred implementation alternative the receiver updates on the basis of the calculated error the modulation index used in reception, whereby the errors in reception are reduced. Consequently the nominal value 0.5 of the modulation index is not used in reception; instead a value used by the transmitter that deviates from the nominal value is employed.

In another implementation alternative of the invention the receiver signals the information about the modulation index estimate to the transmitter. Then the transmitter can adjust the modulation on the basis of the information obtained. Let us take a closer look at FIG. 2 illustrating a TFM transmitter, where the transmitter can adjust the value of the modulation index h in block 212 on the basis of the information signaled by the receiver towards the nominal modulation index value 0.5. In practice, the receiver and the transmitter used in this implementation alternative are transceivers for enabling bi-directional data transmission. FIG. 2 only illustrates transmitter equipment and the receiver side is not shown.

Figure 3:
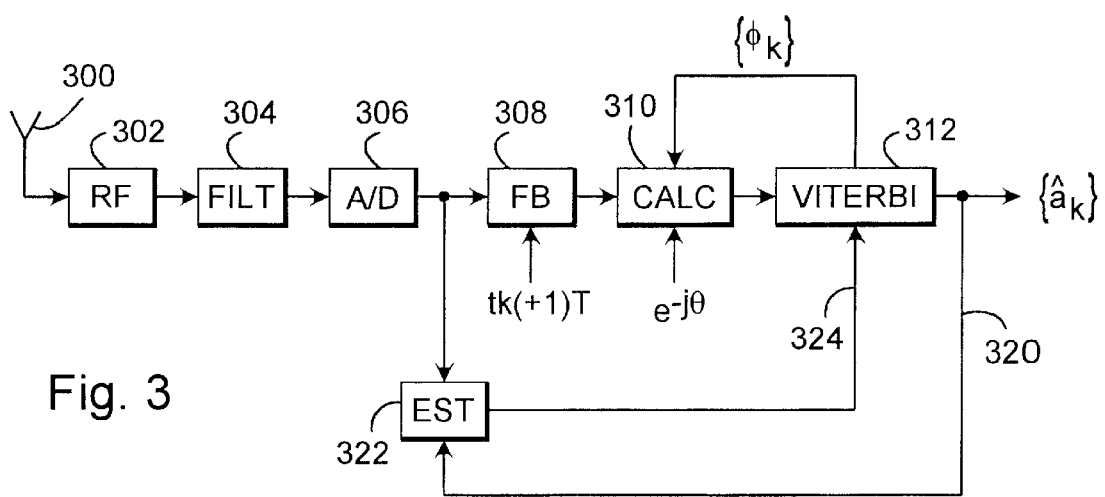
FIG. 3 illustrates an example of a receiver according to a preferred embodiment.

Let us next examine a CPM receiver according to a preferred embodiment of the invention shown in the block diagram of FIG. 3. The receiver comprises an antenna 300, which is used to apply the received signal to radio frequency parts 302, where the signal is changed to an intermediate frequency or baseband. The received signal is now indicated as follows $$r(t) = e^{j\phi(t,\alpha)}e^{j\theta} + w(t)$$

where w(t) is white Gaussian noise and $\theta$ is the phase of the carrier. The signal r(t) is applied to a filter 304, in which anti-alias filtering is carried out. From the filter the signal is applied to sampling means 306, where the signal is converted in accordance with the prior art into digital mode by sampling it using the sampling interval $T_s=T/N$ provided, where N refers to the number of samples taken from the symbol. The signal samples are applied to a filter bank 308. The filter bank 308 consists of a set of filters, the number of which being $M^L$, and the individual impulse response $h^l(mT_s)$ where m indicates the index describing the sampling interval and $l=1, 2, \ldots, M^L$ represents a sampled version of the analogue response thereof $$h^l(t) = \begin{cases} e^{-j\eta^l(T-t, C_0^l, \alpha_0^l)} & 0 \le t \le T \\ 0 & \text{elsewhere} \end{cases}.$$

In this equation, $(C_0^l, \alpha_0^l) = (\alpha_{-L+1}^l, \ldots, \alpha_{-1}^l, \alpha_0^l)$ generally refers to $(\alpha_{-L+1}, \ldots, \alpha_{-1}, \alpha_0)$ and $$\eta^l(t, C_0^l, \alpha_0^l) = 2\pi h \sum_{i=-L+1}^{0} \alpha_i^l q(t - iT).$$

The output signals of the filters are sampled (k+1)T and the metric can be estimated therefrom $$Z_k(C_k, a_k) = \int_{kT}^{(k+1)T} r(t) e^{-j\eta(t, C_k, a_k)} dt,$$

for calculating the branch metric in calculation means 310, if the number of samples N is adequate. Information is also fed to the calculation means concerning the phase estimate of the carrier in the form $e^{-j\tilde{\theta}_k}$, which is obtained from a separate phase synchronization algorithm of the carrier (such as the per-survivor processing, PSP), and which can also, if needed, be used to compensate for the remaining phase jitter caused by the index error regardless of the modulation index estimation. The Viterbi algorithm, which is calculated in calculation means 312, employs a trellis including $PM^{L-1}$ states, which are denoted $S_k=(C_k, \Phi_k)$. An M branch starts from each state, one per each possibly sent symbol $\alpha_k$. The metric $$\lambda_k(S_k, \alpha_k) = Re\{Z_k(C_k, \alpha_k)e^{-j(\Theta_k + \Phi_k)}\}$$

is assigned to the branch associated with $\hat{\alpha}_k$ and the algorithm searches for the best path through the trellis. The decisions $\alpha_{k-D}$ are obtained using delay D. The filter bank 308 and the calculation means 310 to 312 can be implemented using a processor and appropriate software or by means of separate components, as is apparent for those skilled in the art.

The symbol estimates 320 obtained from the output of the Viterbi decoder 312 are applied to estimation means 322, which obtain also the sampled signal as input. The modulation index error is calculated in the estimation means 322 and the modulation index employed in the receiver is updated on the basis of the estimated error. The error is determined as described above. The updated modulation index is applied 324 from the estimation means to the filter bank 308 and to the Viterbi decoder 312. The estimation means 322 can be implemented using for example a processor and appropriate software or by means of separate circuits.

The possible values of table 1 are stored in advance into the estimation means 322 in a preferred embodiment of the invention, whereby the values need not be calculated anew every time for the different symbol alternatives. In another implementation alternative, storing is not carried out, and calculation is performed separately each time.

Even though the invention has above been explained with reference to the example in the accompanying drawings, it is apparent that the invention is not restricted thereto but can be modified in various ways within the scope of the inventive idea disclosed in the attached claims.

What is claimed is:

1. A demodulation method for a TFM-modulated signal comprising symbols, the method comprising the steps of
   calculating an estimate for the symbols,
   determining an estimate for the phase shift,
   determining a modulation index estimate error using the phase shift and the symbol estimates,
   removing the estimated error from the modulation index estimate.

2. A method as claimed in claim 1 further comprising the step of
   calculating an estimate for the received symbols using the modulation index estimate.

3. A demodulation method for a TFM-modulated signal comprising symbols, the method comprising the steps of
   receiving a signal sent from a transmitter at a receiver,
   calculating an estimate for the received symbols,
   determining an estimate for the phase difference of the phases used in the transmission of two consecutive symbols,
   determining a modulation index estimate error using the phase difference and the symbol estimates,
   removing the error estimated from the modulation index estimate.

4. A method as claimed in claim 3 further comprising the step of calculating an estimate for the symbols included in the signal using the modulation index estimate.

5. A method as claimed in claim 3 further comprising the step of signaling a new modulation index estimate for the transmitter.

6. A method as claimed in claim 1 or 3 further comprising the step of
   determining the modulation index estimate error using the phase difference and the estimates of three consecutive symbols.

7. A method as claimed in claim 1 or 3 further comprising the step of
   determining the modulation index estimate error $e_k$ using the following formula:

$$e_k = \frac{\tilde{\psi}_{k+1} - \pi \hat{h}_k b_k}{\pi b_k},$$

where $\psi_{k+1}$ is the phase difference estimate, $h_k$ is the modulation index estimate and b is the term depending on three consecutive symbols.

8. A method as claimed in claim 1 or 3 wherein an estimate is calculated for the symbols using a Viterbi algorithm.

9. A demodulator for a TFM-modulated signal comprising symbols, the demodulator comprising
   means for calculating an estimate for the symbols,
   means for determining an estimate for the phase shift,
   means for determining a modulation index estimate error using the phase shift and the symbol estimates, and
   means for removing the estimated error from the modulation index estimate.

10. A demodulator as claimed in claim 9 comprising means for calculating an estimate for the symbols using the modulation index estimate.

11. A demodulator for a TFM-modulated signal comprising signals, the demodulator comprising
    means for receiving a signal sent from a transmitter,
    means for calculating an estimate for the received symbols,
    means for determining an estimate for the phase difference of the phases used in the transmission of two consecutive symbols,
    means for determining a modulation index estimate error using the phase shift and the symbol estimates, and
    means for removing the estimated error from the modulation index estimate.

12. A demodulator as claimed in claim 11 comprising means for calculating an estimate for the received symbols using the modulation index estimate.

13. A demodulator as claimed in claim 11 comprising means for signaling a new modulation index estimate for the transmitter.

* * * * *